United States Patent
Tourrilhes et al.

(10) Patent No.: US 11,228,533 B2
(45) Date of Patent: Jan. 18, 2022

(54) TECHNIQUES AND ARCHITECTURES FOR AVAILABLE BANDWIDTH ESTIMATION BASED ON MULTI-DIMENSIONAL ANALYSIS

(71) Applicant: Hewlett Packard Enterprise Development LP, Houston, TX (US)

(72) Inventors: Jean Tourrilhes, Palo Alto, CA (US); Puneet Sharma, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 177 days.

(21) Appl. No.: 16/778,491

(22) Filed: Jan. 31, 2020

(65) Prior Publication Data

US 2021/0243133 A1 Aug. 5, 2021

(51) Int. Cl.
| | | |
|---|---|---|
| *H04L 12/825* | (2013.01) | |
| *H04L 12/841* | (2013.01) | |
| *H04L 12/801* | (2013.01) | |
| *H04L 12/26* | (2006.01) | |

(52) U.S. Cl.
CPC .............. *H04L 47/25* (2013.01); *H04L 47/18* (2013.01); *H04L 47/283* (2013.01); *H04L 43/0888* (2013.01); *H04L 43/50* (2013.01)

(58) Field of Classification Search
CPC ....... H04L 47/25; H04L 47/18; H04L 47/283; H04L 43/0888; H04L 43/50
See application file for complete search history.

(56) References Cited

U.S. PATENT DOCUMENTS

| | | | |
|---|---|---|---|
| 7,072,304 B2 | 7/2006 | Ng et al. | |
| 7,180,858 B1* | 2/2007 | Roy | H04L 43/0888 370/229 |
| 7,525,923 B2 | 4/2009 | Matta | |
| 7,768,926 B2 | 8/2010 | Bellur et al. | |
| 8,144,586 B2 | 3/2012 | McNaughton et al. | |
| 8,223,634 B2 | 7/2012 | Tanaka et al. | |
| 2015/0195205 A1* | 7/2015 | Flinta | H04L 47/225 370/230.1 |
| 2015/0333993 A1* | 11/2015 | Welin | H04W 24/08 370/252 |
| 2017/0324664 A1 | 11/2017 | Xu et al. | |

OTHER PUBLICATIONS

Huang et al. "Available Bandwidth Estimation via One-Way Delay Jitter and Queuing Delay Propagation Model." 2006. (Year: 2006).*

(Continued)

*Primary Examiner* — Oussama Roudani
(74) *Attorney, Agent, or Firm* — Jaffery Watson Mendonsa & Hamilton

(57) ABSTRACT

Techniques and architectures for measuring available bandwidth. A train of probe packets is received from a remote electronic device. A network transmission delay for at least two packets from the train of probe packets is measured. Network congestion is estimated utilizing the at least two packets from the train of probe packets. An estimated available bandwidth is computed based on the network transmission and estimated network congestion. One or more network transmission characteristics are modified based on the estimated available bandwidth.

20 Claims, 6 Drawing Sheets

(56) References Cited

OTHER PUBLICATIONS

Anup et al. "An Enhanced Available Bandwidth Estimation Technique for an End-to-End Network Path." Dec. 2016. (Year: 2016).*

Aalto University, Congestion Control Using FEC for Conversational Media, 2014, pp. 1-9, Retrieved from the Internet Oct. 21, 2019 from URL: tools.ietf.org/id/draft/-singh-rmcat-adaptive-fec-01.xml>.

Series Y: Global Information Infrastructure, Internet Protocol Aspects, Next-Generation Networks, Internet of Things and Smart Cities, pp. 1-48, Retrieved from the Internet Oct. 21, 2019 from URL: <itu.int/rec/dologin_pub.asp?lang=e&id=T-REC-Y.1543-201806-IIIPDF-E&type=items>.

* cited by examiner

TECHNIQUES AND ARCHITECTURES FOR AVAILABLE BANDWIDTH ESTIMATION BASED ON MULTI-DIMENSIONAL ANALYSIS

BACKGROUND

Bandwidth measurement and estimation is an essential part of any network traffic engineering solution including, for example, software defined wide area network (SDWAN) solutions. It is useful to know how much capacity is available on each network path before deciding where to place/route and load balance the network traffic. It is also useful to know the available bandwidth to help a user or network administrator understand the current network condition.

In a closed system, it is possible to collect direct measurements on each network device of the traffic path. However, in many cases, it is not possible to use direct measurement. For example, when the network devices are in different administrative domains or when measurable characteristics are hidden by tunneling or encapsulation. This is the case for SDWANs that direct traffic over a best path utilizing the Internet, for example.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
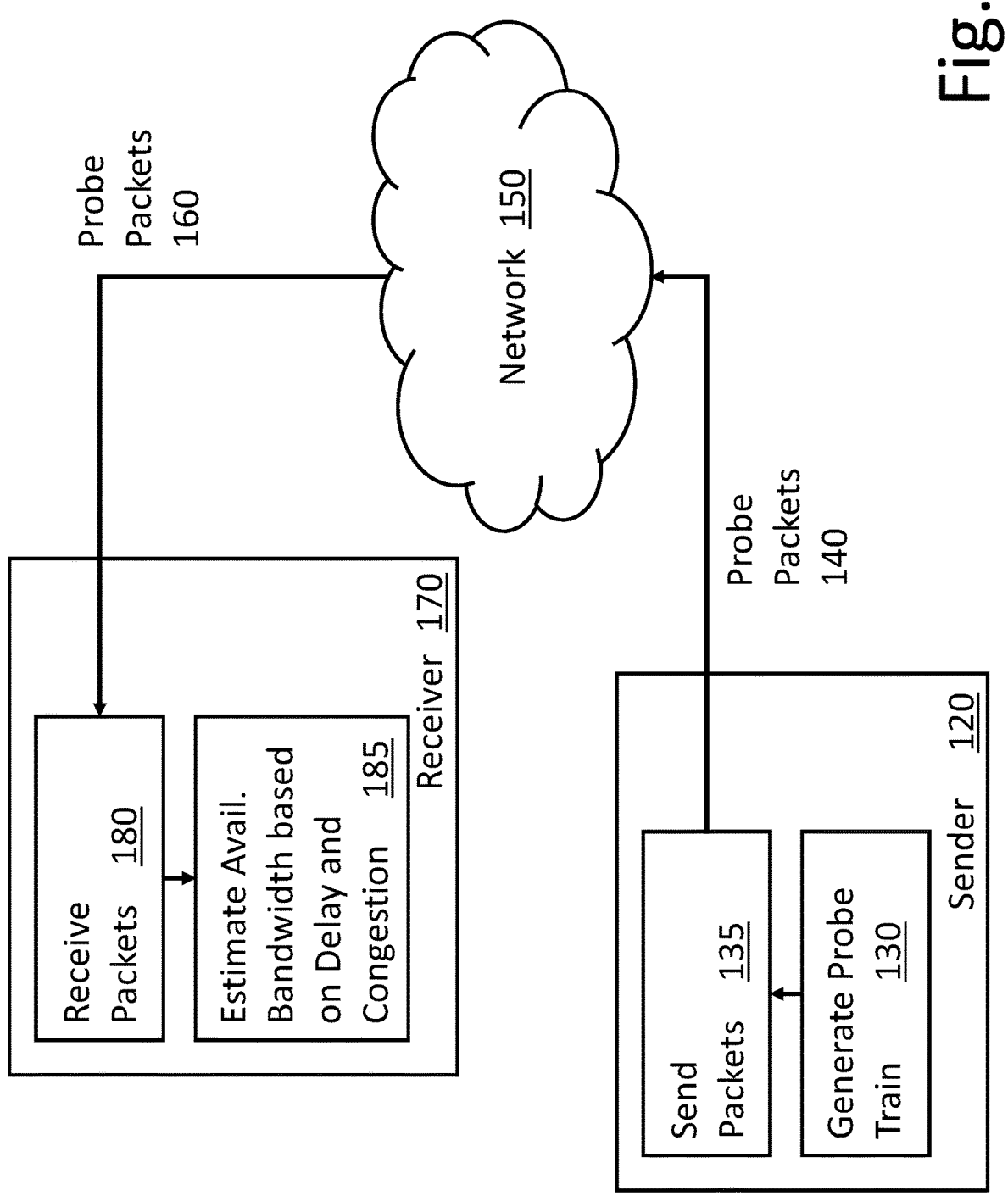
FIG. 1 is a block diagram of one embodiment of an architecture to estimate available bandwidth.

In electronic networks (whether wired or wireless) packets are utilized to transmit data. Networks can be configured to connect any number of endpoints, for example, any number of client devices and any number of server devices. In most networks there exist multiple possible paths between endpoints. Having multiple paths between endpoints improves resilience to failure and can increase network capacity. The ability to efficiently and accurately measure or estimate bandwidth is important for network management and administration in order to efficiently allocate network resources and provide optimal network performance.

Simple network traffic engineering involves having a primary link and a backup link that can be used in case of primary link failure. Multi-rooted trees, such as fat trees, are topologies that offer many parallel paths and have been extensively studied. Many approaches have been proposed to load balance packets in these types of topologies. The Internet is a more complex network and is split across multiple entities and administrative domains. Thus, Internet-related traffic engineering is much more complex. In Internet applications each entity can be required to perform relatively advanced traffic engineering within its own domain and cross-domain interactions can be managed through Border Gateway Protocol (BGP) routing, for example, which allows only for fairly coarse traffic engineering.

Most techniques for traffic engineering are composed of three parts: 1) measurement (where some attributes of the traffic and/or network are measured; 2) optimization (where an optimal/near optimal traffic distribution is determined); and 3) control (where the network is reconfigured to implement the desired traffic distribution).

Various techniques for estimating available bandwidth are described in detail below. Estimation techniques can be broadly categorized as increasing rate methods (e.g., PathChirp, Assolo, Next-v2, Voyager-1) or as decreasing rate methods (e.g., PathCos, Self-Loading Decreasing Rate Train (SLDRT), Voyager-2).

Software Defined Networking (SDN) is an approach for managing networks in which application program interfaces (APIs) allow decoupling of the datapath (e.g., data forwarding) and the control plane (e.g., protocol intelligence) of network elements. Thus, a network controller (e.g., an entity outside the network element) can have fine grained control and visibility over that network element. This can be utilized by the network controller to change the policy of network elements dynamically and/or to centralize the control plane and decision making of the network.

The SDN approach is well-suited for network traffic engineering. The SDN APIs usually define both measurement and control and this enables the network controller to measure the network and dictate a distribution of traffic. However, one limitation of SDN is that it assumes tight coupling between the network controller and the network elements. This can work at small to medium scale, but may not scale to larger networks. Its efficiency is also diminished if the network between the network controller and the network elements has limited performance (e.g., low bandwidth and/or high latency). Moreover, the SDN approach usually does not allow crossing of administrative boundaries because different entities can only trust controlled and limited interactions between each other.

Most large organizations are distributed across multiple physical locations. As a result, their network is includes a set of local area networks (LANs) supporting the local physical locations of the organization and a set of wide area network (WAN) links connecting those LANs to each other.

For example, a large bank or retailer can have multiple physical locations or branches. Each location or branch has a corresponding set of LANs. In a traditional configuration all branches and locations connect to a few central locations using dedicated WAN links (e.g., Multi-Protocol Label Switching, or MPLS) and the central locations connect to the Internet using WAN links provided by the Internet Service Provider (ISP) or telecom company. These WAN links can offer high availability and quality of service (QoS) at a high monetary cost.

Accurate techniques for bandwidth estimation are useful for optimizing end-to-end transport performance, network routing, peer-to-peer file distribution and similar functionalities. Bandwidth estimation is also important for traffic engineering and network capacity planning.

Various techniques have been developed to estimate bandwidth; however, the commonly used techniques are generally too simplistic to provide a complete and accurate characterization of network bandwidth and conditions.

Because bandwidth measurement is an important part of any network traffic engineering solution (including software defined wide area networks, or SDWANs), improved techniques will result in improved network performance and improved traffic engineering.

As mentioned above, in a closed system direct measurement can be used to collect the desired information. However, in many network architectures, including SDWANs, direct measurements are not possible and bandwidth estimation techniques are utilized.

Bandwidth estimation can be performed by, for example, probing the network path with probe packets (that can be specially crafted for the task) sent from one end of the path to the other end of the path. The receiver end can be used to measure the receive time of the packets and changes to the packet delay/time pattern to estimate path characteristics, such as, for example, path capacity, available bandwidth and/or bulk transfer capacity.

Many bandwidth estimation techniques currently exist including, for example, PathChirp, PathCos++, SLDRT, utilize a Probe Rate Model (PRM). The PRM model is based on creating temporary congestion on the network path and measuring the increase in queuing delay of the probe packets to infer when the path is congested. By determining when the path is congested and when it is not congested, these current methods can generate an estimate of the available bandwidth.

The PRM model uses packet timing to infer congestion and assumes that there is no packet loss on the network path. However, buffers on the network path are not infinite, so significant congestion can cause packet loss. Further, some network devices react to congestion by exclusively producing packet losses and never increasing queuing delay, which defeats the PRM methods and prevents them from accurately measuring available bandwidth.

There are, described in greater detail below, advantageous modifications to the PRM model that can be utilized to infer path congestion from packet delay and packet losses. This improved technique can result in dramatically improved performance in the presence of heavy packet losses due to congestion. It can also offer a technique to measure available bandwidth on paths that do not conform to traditional PRM models.

FIG. 1 is a block diagram of one embodiment of an architecture to estimate available bandwidth. In the example of FIG. 1, sender 120 generates a probe train 130 and sends the packets 135 over network 150. The packets that are sent by sender 120 are probe packets 140 that move through network 150 to receiver 170.

One or more of probe packets 140 can be lost or delayed to result in probe packets 160 that are received by receiver 170. When probe packets 160 arrive, receiver 170 receives the packets 180 and estimates available bandwidth 185 based on both delay and packet loss measurements. In various embodiments, receiver 170 can use both queuing delay and packet losses for available bandwidth estimation. As described in greater detail below, a new congestion metric can be utilized that merges both the queuing delay information and the packet loss information. In some embodiments, this new congestion metric can be retrofitted in existing estimation methods to improve the performance of the estimation technique. Existing PRM methods are not designed to handle packet losses, so the techniques described herein provide a fundamental change to estimation techniques the provides significant bandwidth estimation improvements.

Figure 2:
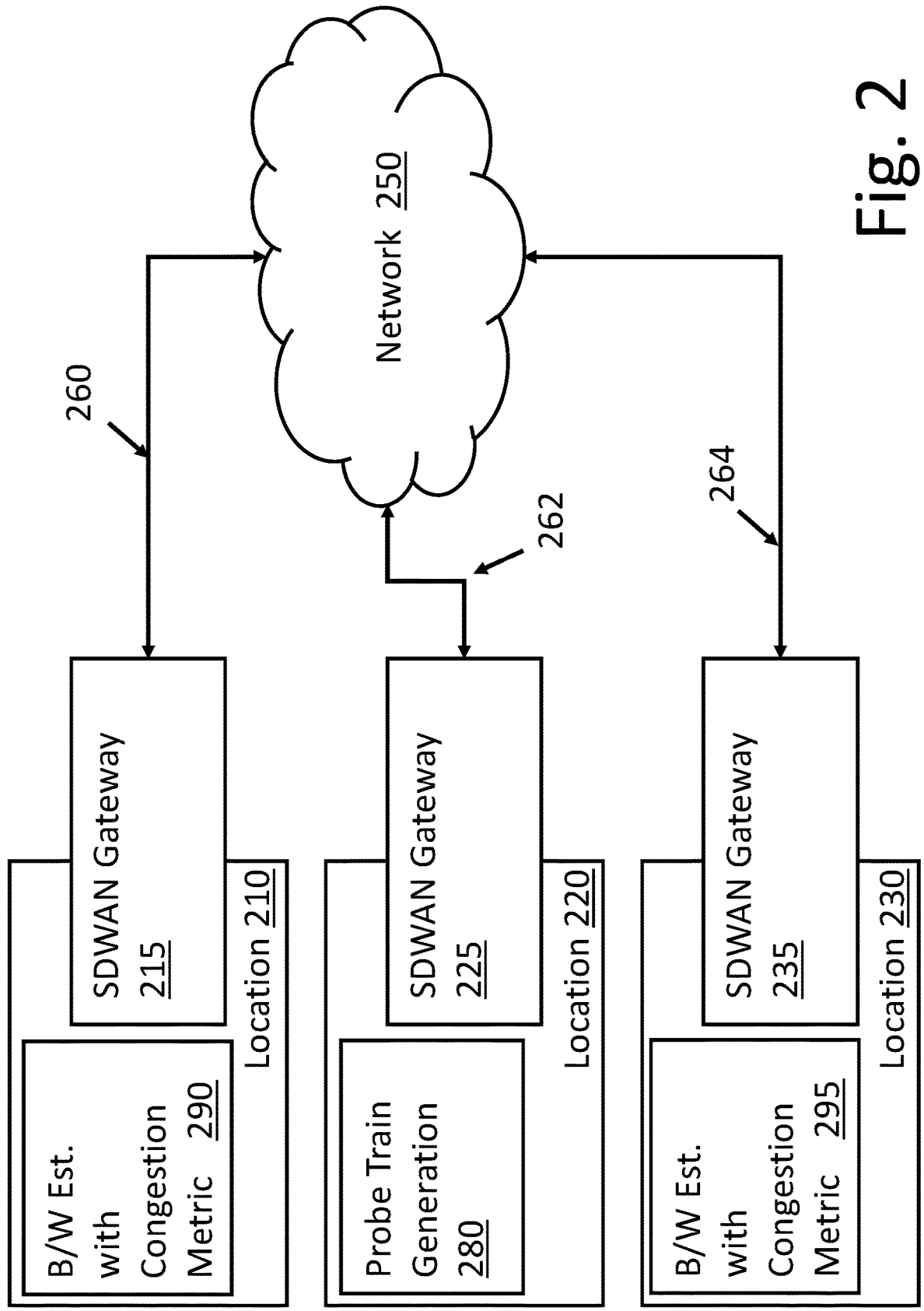
FIG. 2 is a block diagram of one embodiment of a basic SDWAN architecture.

Software Defined WAN (SDWAN) can utilize SDN principles to manage WAN connectivity. FIG. 2 is a block diagram of one embodiment of a basic SDWAN architecture. This can offer centralized visibility and control over WAN connectivity and can reduce the cost of WAN connectivity. Cost reduction can be accomplished by replacing dedicated WAN links with tunnels (e.g., 260, 262, 264). In the example above, each branch location (e.g., 210, 220, 230) can replace a consumer LAN interface (e.g., DSL, Cellular Data, cable modem) with a SDWAN gateway (e.g., 215, 225, 235) that creates one or more private tunnels (e.g., virtual private network, or VPN) to connect securely to other branches and locations over WAN links and over the Internet (e.g., 250).

While SDWAN can result in cost reductions, consumer WAN technology over the Internet may not provide the same level of availability and quality of service as dedicated WAN links. One simple SDWAN implementation is to have an SDWAN gateway (e.g., 215, 225, 235) in each physical location (e.g., 210, 220, 230) with multiple WAN links to the Internet (e.g., 250). The SDWAN gateway can implement tunnel handoff and create parallel tunnels of the internet using each WAN link and then use network traffic engineering to direct traffic to the appropriate tunnel with the goal of optimally using the available network capacity. For example, if the SDWAN gateway detects that a WAN link is down, it can direct traffic away from that WAN link to a tunnel not using that WAN link.

SDWAN gateways (e.g., 215, 225, 235) can also perform more advanced traffic engineering. For example, the gateway can monitor the performance of each tunnel (e.g., in terms of latency and/or throughput) and load balance the traffic or map each traffic type to the appropriate tunnel. One component of traffic engineering in these settings is measurement of performance for each tunnel (e.g., 260, 262, 264).

Each tunnel provides a network path across the Internet and the tunneled packets are processed by multiple network elements. The network path used by a tunnel (outside the tunnel) and the network path within the tunnel are logically different (i.e., they have different addresses), but the two network paths go through the same network elements and have almost the same performance, and their performance characteristics are strongly correlated. Thus, in various embodiments, measuring the performance of an Internet tunnel can be done by measuring the network path outside or inside the tunnel and for the discussion that follows, they can be considered the same path.

Direct measurement or SDN approach cannot be used for these network paths because network elements can belong to different administrative domains. Thus, path measurement is done via end-to-end network path estimation methods by sending probe packets from one end of the path to the other end of the path.

The main approach for end-to-end network path estimation is active probing. A device at one end of the path send probe packets to a device at the other end of the path. The packets are only used to estimate bandwidth and do not carry other useful data (beyond the data payload required by the network path estimation process). It is also possible to do passive measurements, either by measuring delays experienced by existing data transmitted over the network path or by modulating that data to have specific characteristics. Another variation is single-ended measurement where the method uses some way to get probe packets reflected back to the sender.

Different method may estimate different properties of the network path. Bandwidth estimation is a subset of network path estimation. Path capacity is the maximum amount of traffic bandwidth that can be sent if the network path is idle (i.e., without any competing traffic). Bulk Transfer Capacity (BTC), for example, is the bandwidth a Transfer Control Protocol (TCP) connection would get if placed on the network path. Latency is the one-way delay from sender to receiver, and round-trip time (RTT) is the two-way delay.

With active probing, the sender sends a series of probe packet patterns, which can be based on the estimation method to be used and can be configured to trigger specific behaviors from network elements along the path. For example, in many cases the packet pattern is a probe train, the packets and interval between packets are intended to probe various bandwidths across the packet pattern. The receiver measures the received time of the packets, may compute the one-way delay of each packet (i.e., the time taken by the packet to reach the receiver device from the sender device) and examine the changes to the packet pattern. The estimation method uses a simplified network model to convert those measurements into estimates of various network path characteristics.

There are two main classes of bandwidth estimation: 1) those based on a probe gap model (PGM) and 2) those based on the probe rate model (PRM). For PGM, the assumption is that two closely sent packets will see the gap between them increase in proportion to the load on the most loaded queue (due to queuing delay on that queue). For PRM, the assumption is that when packets are sent at a rate lower than the bottleneck bandwidth, the traffic pattern will mostly be unchanged and when packets are sent at a rate greater than the bottleneck bandwidth, those packets will suffer extra queuing delay due to congestion.

In practice, all these methods are trying to infer network path congestion by trying to estimate variations in the queuing delay experienced by packets at different network elements in the network path. The queuing delay is one of the components of the packet one-way delay through the network path. These methods compare the one-way delay of various probe packets to estimate the variations in the queuing delay. For example, with PGM, two packets may be sent at known sending intervals. The measured received interval is assumed to be the sum of the sending interval and the difference in queuing delay between packets.

Thus, the improved bandwidth estimation techniques described herein can be provided to result in an improved SDWAN architecture. A probe train can be generated at a first location (e.g., 220) by the SDWAN gateway (e.g., 225) or other network component (not illustrated in FIG. 2) and can be transmitted to one or more other locations (e.g., 210, 230) and received via the corresponding SDWAN gateway (e.g., 215, 235) wherein congestion metric based bandwidth estimation (e.g., 290, 295) can be generated by the SDWAN gateway (e.g., 215, 235) or other network component (not illustrated in FIG. 2).

The bandwidth estimation information can be shared via network 250 and/or utilized by one or more devices at the location where the estimate was generated. The bandwidth estimation information can be used for traffic engineering and/or for other purposes.

Figure 3:
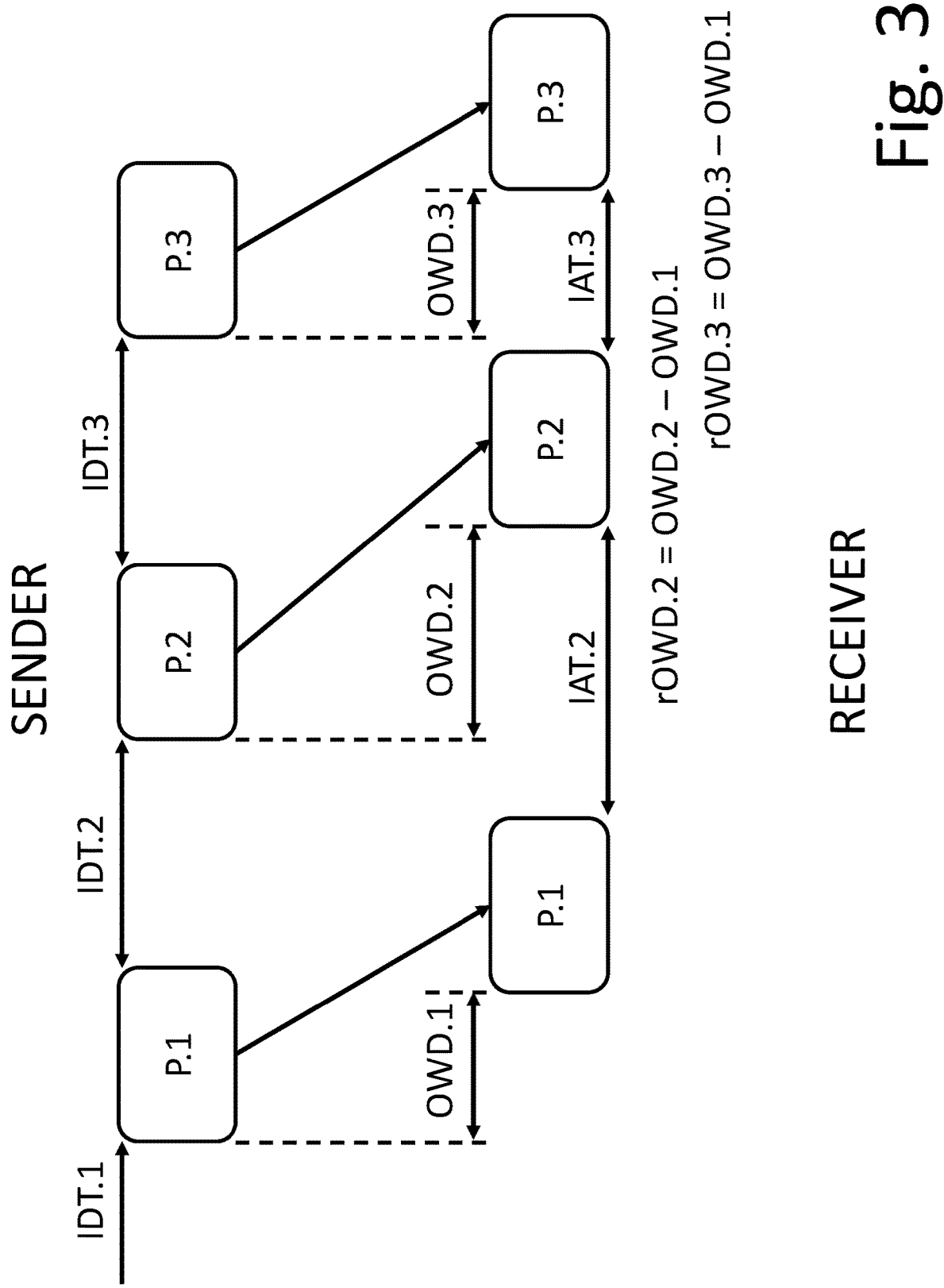
FIG. 3 is a block diagram that conceptually illustrates packet characteristics that can be utilized by the techniques described herein.

FIG. 3 is a block diagram that conceptually illustrates packet characteristics that can be utilized by the techniques described herein. Most PRM-based techniques send packets in a very controlled manner so that congestion can be accurately probed. In general, the packets (e.g., P.1, P.2, P.3) are generated in a very specific pattern with specific time intervals between packets. The interval between packets defines an instantaneous rate being probed and the network path will react to that probed rate. For each packet the Inter Departure time (IDT) is the amount of time between sending the previous packet and sending the current packet (e.g., IDT.1, IDT.2, IDT.3, IDT.4). The IDT can be computed from the desired probing rate where:

$$IDT = PacketSize/ProbedRate$$

It is possible to modify most techniques to measure actual IDT; however, the techniques described herein can be utilized based on desired IDT or actual IDT.

PRM techniques measure when packets are received. For each packet the Inter Arrival Time (IAT) is the amount of time between receiving the previous packet and receiving the current packet (e.g., IAT.2, IAT.3). From the IAT, the instantaneous per-packet received rate can be computed as:

$$\text{Received Rate} = PacketSize/IAT$$

The overall IAT (oIAT) is the difference in received time between two non-adjacent/consecutive packets.

The vast majority of PRM-based techniques measure the delays of received packets to determine the network path bandwidth. They measure, for each packet, the One-Way Delay (OWD), the time difference between when the packet was sent (sent time) and when the packet was received (received time) (e.g., OWD.1, OWD.2, OWD.3). Most techniques compare the OWD for multiple packets.

The OWD for a packet is mostly governed by the propagation delay of the network path, the transmission time of the slowest link of the path and the accumulated queuing delay in all the network elements in the path. Thus, for each packet the OWD can be:

$$OWD(i) = pd + st(size) + sum(qd(e,i))$$

Where "pd" is the total propagation delay, "st(size)" is the slowest transmission time for this packet size, and "qd(e,i)" is the queuing delay at element 'e' for packet 'i'. These PRM techniques assume a fairly simple queuing model where qd(e,i) is generally a function of the congestion at element 'e' when packet 'i' arrives.

Because the sender and the receiver are using different clocks to measure departure and arrival times, those clocks may not be perfectly synchronized. Therefore, it is difficult to accurately measure the OWD of packets. Fortunately, in most cases, the absolute OWD of the packet does not matter and only the difference tween the OWDs of different packets matters. Over the short time of a probe train clock drift is negligible and the difference between OWDs can be sufficiently accurate.

In some embodiments, the absolute OWD is not used, but a relative OWD can be used. For each packet, the relative OWD (rOWD) is the measured OWD of the corresponding packet minus the OWD of the first packet (e.g., rOWD.2=OWD.2−OWD.1). This relative OWD estimate and extra queuing delay of a packet respective to the first packet. If there is no packet loss and no packet reordering, packets are sent and received in the same order. In this case, the IAT, IDT and OWD of each packet are directly related. If OWDp is the OWD of the current packet, then:

$$IAT = OWDc - OWDp + IDT$$

Described below are new techniques to utilize both queuing delay information and packet loss information to provide a bandwidth estimation technique. A new congestion metric is described that merges both queuing delay information and packet loss information. This new congestion metric can be the basis of improved bandwidth estimation techniques.

The improved, integrated techniques described below can provide advantages over existing PRM-based strategies. These advantages can include one or more of use of both queuing delay and packet loss to provide a better congestion metric than using queuing delay alone and or increased performance with reduced overhead. Thus, these techniques can more efficient solution than using previous techniques.

In general, PRM-based techniques were not designed to handle packet losses. Tolerating packet losses can help PRM-based techniques, but the performance is degraded. However, packet losses are not an annoyance that needs to be mitigated, but an important congestion signal.

The main use of bandwidth estimation is for traffic engineering, or deciding how to place traffic on network paths. The vast majority of traffic uses the TCP protocol, so traffic engineering is used to manage traffic using available bandwidth as a prediction of TCP performance, which is mostly governed by TCP congestion control. In general, TCP congestion control tries to determine the optimal rate to send traffic by inferring when it is congesting the path and when it is not. If the path is not congested, the sending rate is increased and when it is congested, decreasing the sending rate.

Thus, most TCP congestion control techniques use information about packet losses to adjust the sending rate. Similarly, the PRM-based techniques can be improved by using information about packet losses to perform available bandwidth estimation. However, existing TCP congestion control cannot simply be applied and utilized for available bandwidth estimation. First, the sending rate of TCP, the Bulk Transfer Capacity (BTC) is not the same as Available Bandwidth (ABW). It can be quite different due to congestion backoff, TCP fair sharing and the way that shared queues schedule packets based on input rates. Also, TCP congestion control aims to compute directly the congestion window and almost never sender bandwidth.

As described in greater detail below, in various embodiments, a train of probe packets is generated by a sender. The receiver measures the OWD of each received probe packet. Based on the OWD, a single packet or a pair of packets can be selected and used to compute an estimate of the available bandwidth.

In one embodiment, a approach to determine packet losses with PRM-based techniques is to perform chirp train reconstruction. The idea is for the receiver to construct a new received chirp train as if no packet losses happened and as if it went through a bottleneck of the same capacity and behavior but with an infinite queue. The first part of the chirp train reconstruction is packet reconstruction where the lost packets are added to the received chirp train. The second part of chirp train reconstruction is OWD reconstruction where the OWD of received and lost packets are modified to match the infinite queue. In one embodiment, any packet that follows a lost packet experienced less delay than it would have experienced if that lost packet had been queued, therefore the OWD of the packets is increased based on packet losses prior to that packet.

When using chirp train reconstruction, the reconstructed chirp train matches the PRM model and is the type of chirp train that can be utilized by PRM-based techniques. With chirp train reconstruction, after the chirp train has been reconstructed PRM-based techniques can be utilized to estimate available bandwidth.

Most PRM-based techniques use the OWD of each packet as a measure of the congestion experienced by that packet. Those techniques use a relative OWD and do not require the OWD to be the actual OWD of the packet. In those PRM-based techniques, the OWD of the packets could be replaced with a suitable per-packet metric, as long as this metric estimates the congestion of the packet and behaves similarly to the OWD. In some embodiments, the OWD reconstruction described above can be an effective congestion metric. In alternative embodiments, other congestion metrics can be used.

In alternative embodiments, a new per-packet congestion metric based on OWD and packet losses can be used with a set of received packets. In some embodiments, the congestion metric can be computed for each packet indicating the measured level of congestion. The congestion metric can be based on congestion indicators, the OWDs and packet losses. A PRM-based technique, for example, can be modified to use the congestion metric (instead of OWD) to select the relevant packets. A final available bandwidth estimate can then be computed based on the selected packets. This technique avoids issues associated with reconstructed packets at the cost of decreased granularity of an OWD curve.

In various embodiments described herein, a new congestion metric that is computed from received packets can be utilized by a PRM-based technique. Existing PRM techniques use packet delay exclusively (in the form of OWD or IAT), so are less accurate. In particular, NEXT-v2 performs packet reconstruction, it adds lost packets to the chirp train; however, the OWD of the lost packet is computed purely based on OWD and the OWD of received packets is not modified. Similarly, no TCP congestion control defines a per-packet congestion metric based on packet losses and packet delay.

A congestion metric could be based on packet losses alone. However, use of the new congestion metric described herein provides a more flexible mechanism and can be integrated with PRM-based techniques if desired. For example, in most PRM-based techniques, the OWD can be replaced with the new congestion metric.

In various embodiments, the new congestion metric can be computed for each packet in a probe train and can be utilized to indicate the measured level of congestion for the corresponding packet. For packet 'k', the congestion metric may depend on the OWD of every packet in the train and packet losses before every packet, for example:

$$mc(k) \text{function}(\text{delays}(0 \ldots n); \text{losses}(0 \ldots n))$$

The packet OWD is already a very good metric and OWD reconstruction is similar to a useful metric to use, so a metric based on OWD reconstruction could be simplified to the form:

$$mc(k) = owd(k) + \text{function}(\text{losses}(0 \ldots n))$$

There are many possible congestion metrics based on packet delay and packet losses, and they may offer different levels of performance and computation complexity.

Some congestion metrics may integrate better with specific PRM-based techniques, so it may be possible, in various different embodiments, to customize a congestion metric for the target PRM-based technique to be used. In some embodiments, a congestion metric can be based on a shadow function estimating the congestion level at the queue. The shadow function can consider other data in addition to delays and losses, and can take as input the type of queue (e.g., tail drop, AQM, rate limiter) and may emulate that type of queue and compute a congestion metric specific to that type of queue. In addition, in some embodiments, the shadow function may automatically detect the type of queue. Thus, an alternative congestion metric can be described as:

$mc(k)$=function(queue-type; delays(0 . . . $n$); losses(0 . . . $n$); history; other)

The following example embodiment utilizes a congestion metric based on OWD reconstruction. The metric is based on some simplifying assumptions, is useful for certain scenarios, and is intended to be just one simple example embodiment of the techniques and mechanisms described herein. Other versions of a congestion metric (some of which are described below) can be constructed differently and provide different performance characteristics.

Assuming a stable bottleneck that processes probe packets at a constant rate BCR in congestion, the rate BCR may not be the available bandwidth, if there is cross traffic it would be different. In most cases BCR would not be constant; however, for the present example, BCR is assumed constant. In the following example, probe packets are sent at a rate PSR that is higher than BCR. The bottleneck is congested and probe packets are passed through the bottleneck at rate BCR and are received at rate BCR.

Assuming the queue does not increase during congestion, the OWD increase would be zero. The excess rate will be dropped and the rate of dropped packets, DPR, is:

DPR=PSR−BCR

The ratio of packet losses is:

$P$loss=(PSR−BCR)/PSR=1−(BCR/PSR)

BCR is related to the IAT when congested:

BCR=PacketSize/bcIAT

PSR is related to the IDT of probe packets:

PSR=PacketSize/IDT

The ratio of packet losses is:

$P$loss=1−(IDT/bcIAT)

If a packet is dropped it does not occupy a space in the queue and it does not need to be transmitted. Assuming an ideal queue that does not drop any packets (i.e., without loss), every dropped packet would not be dropped in that queue (i.e., every packet occupies a slot and needs to be transmitted). The packets are transmitted at rate BCR. Every dropped packet would delay subsequent packets by the time it would take to be transmitted at rate BCR:

lossOWD=PacketSize/BCR=bcIAT

As during an IAT, if there are nloss, for a given IAT, the OWD increase for subsequent packets is:

increaseOWD=$n$loss*bcIAT

The OWD additions due to packet loss are cumulative and enables reconstruction of the OWD curve under congestion. If one packet is lost its lossOWD is added to all subsequent packets. However, this creates an issue because the OWD curve does not return to its minimum value after congestion and the OWD curve should be reconstructed under decongestion as well.

As the probe rate PSR decreases and becomes smaller than BCR, the actual queue sends packets at rate BCR (it sends more packets than in receives and shrinks). When the queue is empty the queue can no longer send at rate BCR and starts sending at rate PSR. The actual number of packets queues at the bottleneck is much smaller than the ideal queue without losses because of the packet drops. When the bottleneck rate becomes lower than BCR the ideal queue would still be sending at rate BCR because it is not empty. Thus, packets received at rate PRR:

PRR=PacketSize/IAT

If probes are received at rate PRR, which is lower than BCR, the ideal queue would send those lost packets at rate:

LPR=BCR−PRR

During an IAT interval the number of lost packets sent by the ideal queue would be:

numLoss=(BCR−PRR)/PacketSize*IAT

Each packet in the virtual queue can be sent individually at rate BCR, so each packet in the queue representing the queue delay:

excessOWD=PacketSize/BCR

During an IAT where PRR is lower than BCR the queue delay would be reduced by reduceOWD=numLoss*excessOWD reduceOWD=(BCR−PRR)*IAT/BCR reduceOWD=(1−PRR/BCR)*IAT reduceOWD=IAT−bcIAT The OWD reductions are cumulative until the queue size of the ideal queue is zero, which means until all the OWD additions due to loss have been removed.

From the above information the final congestion metric can be determined, which is based on the OWD and cumulative sum of increases and reductions. Thus:

$mc(k)$=owd($k$)=sum(0, $k$, increaseOWD($i$))+sum(0, $k$, reduceOWD($i$))

Thus, the techniques and mechanisms described herein can function to receive packets that were transmitted over a path through a network, for some received packets, compute a per-packet congestion metric based on both the received times of packets and the amount of packet loss, and compute an estimated available bandwidth for the network path based on the congestion metric of some of the received packets.

In some embodiments, an Excursion Detection Algorithm (EDA) can be used to select a packet based on the congestion metric. In some embodiments, a Bump Detection Algorithm (BDA) can be used to select a pair of packets based on the congestion metric. In some embodiments, the congestion metric from a packet is the sum of the OWD for the packet and some additional factor based on packet losses. The congestion metric can be a complex function based on the OWD of all received packets, their IDT, their IAT and the amounts of packet loss between each received packet.

Figure 4:
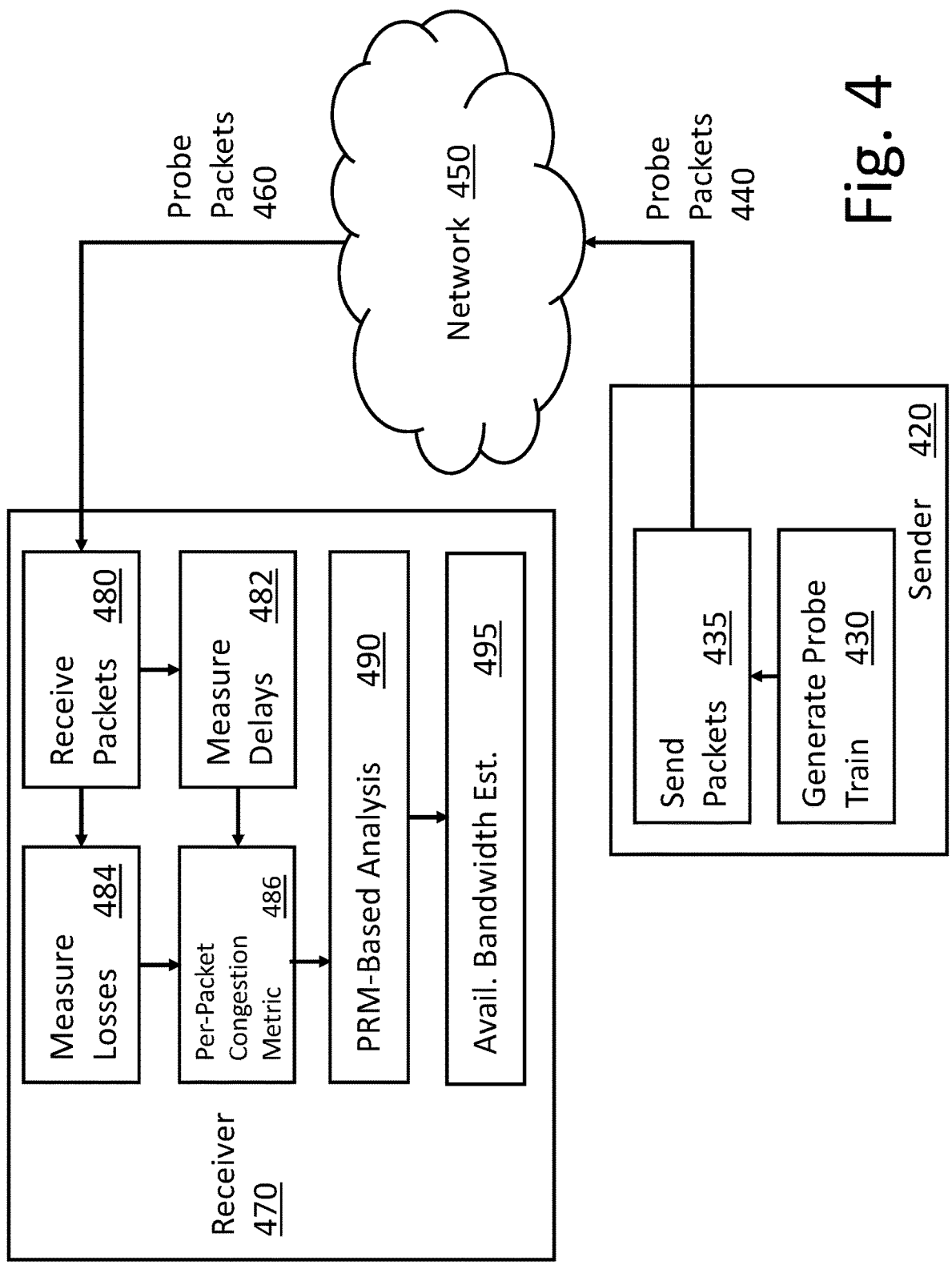
FIG. 4 is a block diagram of one embodiment of an architecture that can estimate available bandwidth as described herein.

FIG. 4 is a block diagram of one embodiment of an architecture that can estimate available bandwidth as described herein. In some embodiments, the elements of FIG. 4 can be part of an SDWAN as described above. In other embodiments, other network configurations can be utilized.

In the example of FIG. 4, sender 420 communicates with receiver 470 over network 450. Sender 420 can generate probe train 430 and send packets 435 to cause probe packets 440 to be sent over network 450, which can be, for example, the Internet.

Probe packets 440 move through network 450 to receiver 470. One or more of probe packets 440 can be lost or delayed to result in probe packets 460 that are received by receiver 470. When probe packets 460 arrive, receiver 470 receives the packets 480 and both measures delays 482 and measures losses 484. As described above, the delays and losses are utilized to generate congestion metric 486. In various embodiments, the congestion metric can be utilized by a PRM-based analysis 490 to determine available bandwidth 495.

One benefit of integrating packet loss information with PRM-based model information is that the resulting mechanism can perform available bandwidth estimation in common network scenarios, when congestion does not produce increased queuing delay. It also improves the quality of available bandwidth estimation in other common scenarios, for example, when congestion produces a mix of queuing delay and packet losses. Better available bandwidth estimate in turn improves the efficiency of traffic engineering for most networks, especially in the context of SDWAN.

Figure 5:
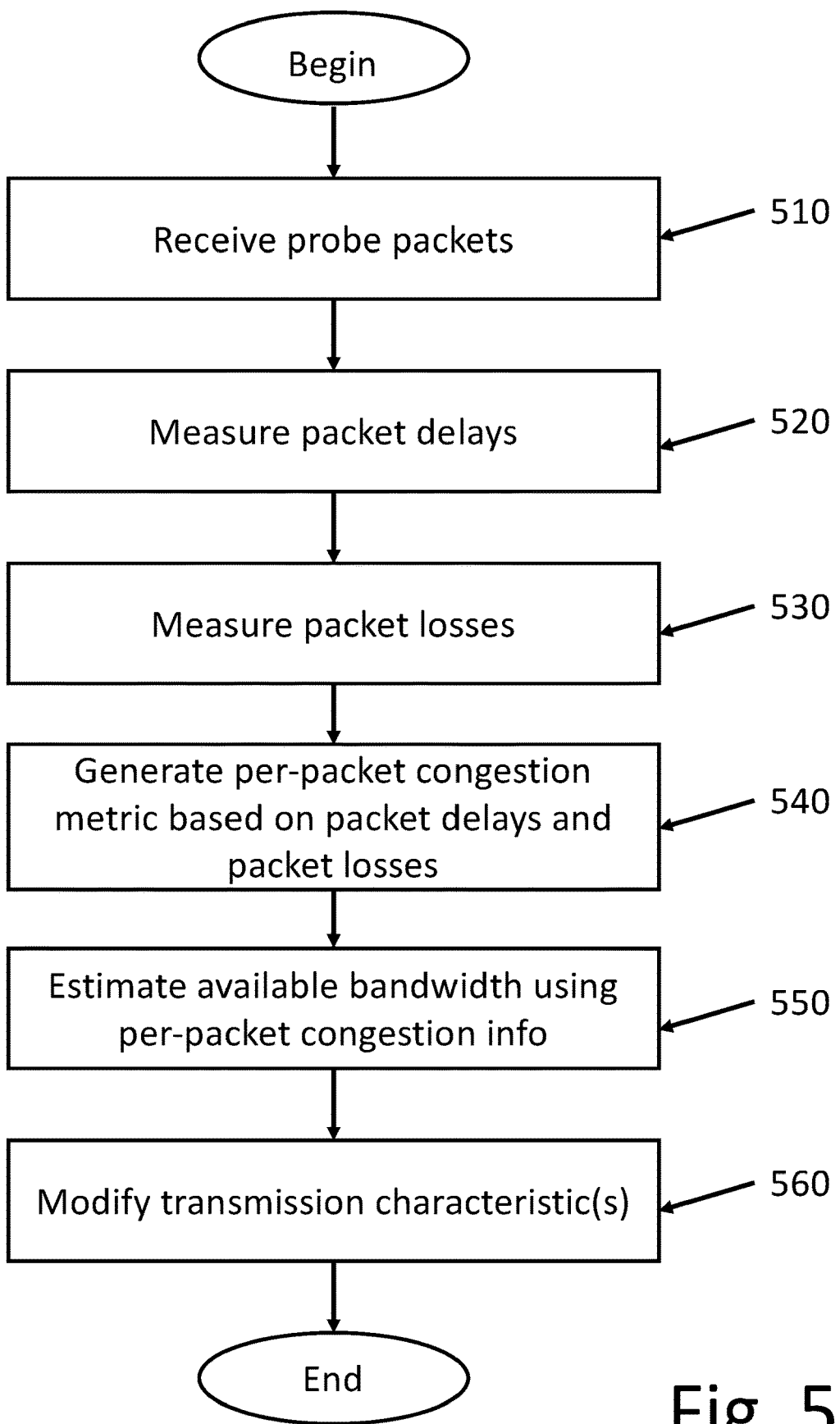
FIG. 5 is a flow diagram of one embodiment of a technique to estimate available bandwidth as described herein.

FIG. 5 is a flow diagram of one embodiment of a technique to estimate available bandwidth as described herein. The technique described with respect to FIG. 5 can utilize one or more of the techniques for estimating network congestion discussed above and can be implemented by one or more of the devices (or network components) discussed herein.

One or more probe packets are received, 510. In one embodiment, the probe packets are received by an SDWAN gateway (or other SDWAN device) via a network interface. The probe packets can be generated by, for example, a remote device having access to the SDWAN network (e.g., another SDWAN gateway). In some embodiments, the SDWAN gateway (or other SDWAN device) has traffic engineering capability to change transmit and/or receive characteristics/settings/configurations/etc. in response to available bandwidth and/or other network measurements.

Packet delay is measured for one or more packets, 520. Packet losses are measured for one or more packets, 530. The flow diagram illustrates the measurement of delay and losses as sequential; however, these measurements can be performed in parallel. Further, losses can be measured before delay, if handled sequentially.

A congestion metric based on network congestion is generated, 540. One or more of the techniques described above can be utilized to determine network congestion. In various embodiments, both packet delay and packet losses can be utilized to determine network congestion. The resulting estimation/determination can be a congestion metric. This congestion metric can be utilized in bandwidth determination mechanisms by being applied to modified PRM-based strategies or in new estimation mechanisms.

Available bandwidth is estimated utilizing packet delay information and per-packet congestion information, 550. In some embodiments, the congestion metric can be utilized in a PRM-based technique to estimate available network path bandwidth. In alternate embodiments, other techniques utilizing the congestion metric and/or packet loss and packet delay information can be used.

One or more network transmission characteristics can be modified based on the estimated available bandwidth, 560. Various network transmission characteristics (e.g., path selection, queue depth, queue type) can be selected/modified based on the estimated available bandwidth. Alternatively, the estimated available bandwidth can be shown to a user or administrator, as part of a network management tool, as part of a web page, or in a diagnostic tool/log, for example.

Figure 6:
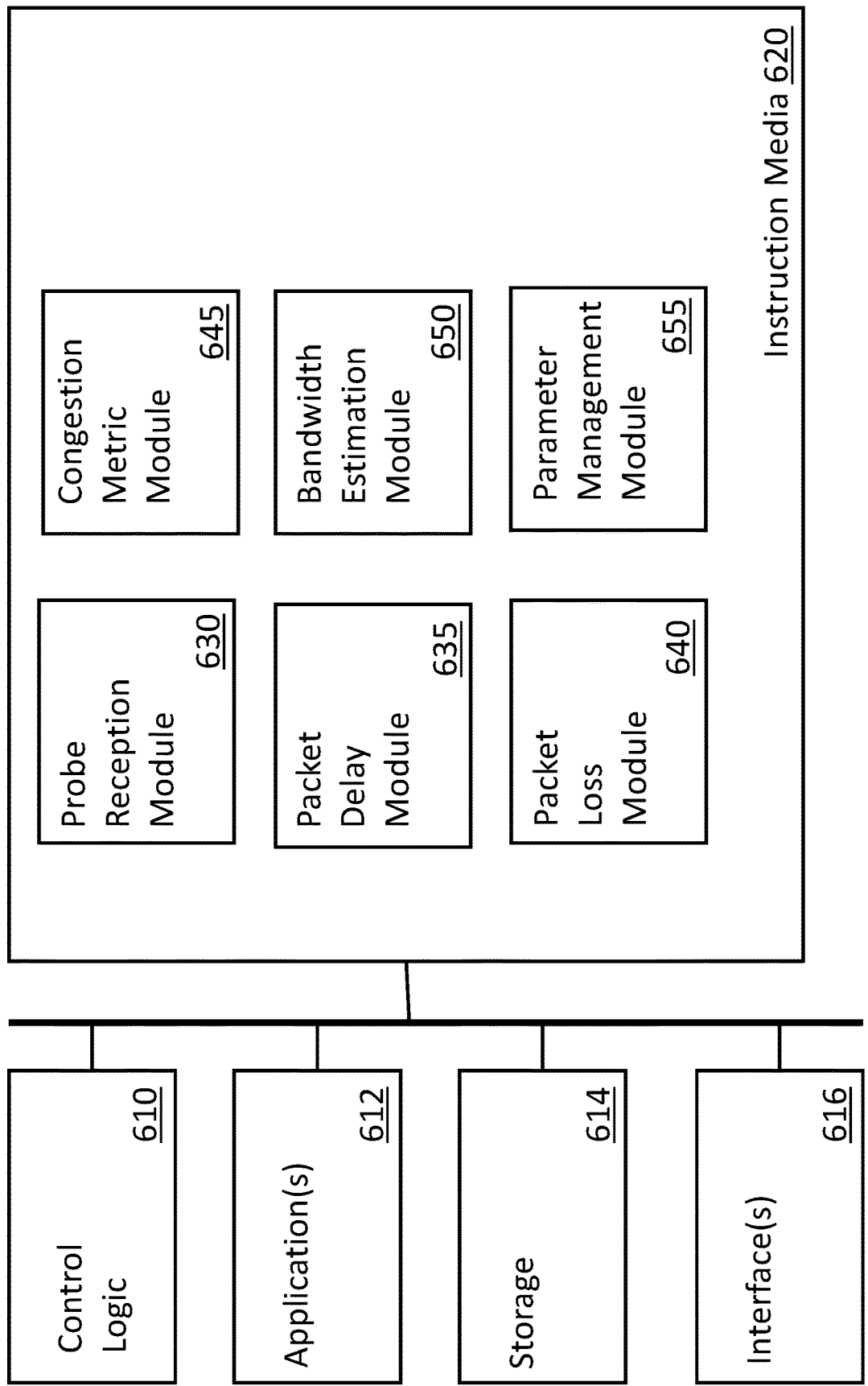
FIG. 6 is a block diagram of one embodiment of a functional agent that can estimate available bandwidth as described herein.

FIG. 6 is a block diagram of one embodiment of a functional agent that can estimate available bandwidth as described herein. In one embodiment, one or more bandwidth estimation agents may exist and/or operate within the host (e.g., SDWAN) network. The agent of FIG. 6 may provide functionality as described, for example, with respect to FIGS. 1-5. The agent of FIG. 6 may also provide additional functionality.

In one embodiment, bandwidth estimation agent 600 includes control logic 610, which implements logical functional control to direct operation of bandwidth estimation agent 600, and/or hardware associated with directing operation of bandwidth estimation agent 600. Logic may be hardware logic circuits and/or software routines. In one embodiment, bandwidth estimation agent 600 includes one or more applications 612, which represent a code sequence and/or programs that provide instructions to control logic 610.

Bandwidth estimation agent 600 includes storage 614, which represents a memory device and/or access to a memory resource for storing data and/or instructions. Storage 614 may include memory local to bandwidth estimation agent 600, as well as, or alternatively, including memory of the host system on which bandwidth estimation agent 600 resides. Bandwidth estimation agent 600 also includes one or more interfaces 616, which represent access interfaces to/from (an input/output interface) bandwidth estimation agent 600 with regard to entities (electronic or human) external to bandwidth estimation agent 600.

Bandwidth estimation agent 600 also includes instruction media 620, which represents one or more instructions storage media (e.g., internal random access memory, optical storage) for functions or modules that enable bandwidth estimation agent 600 to provide the bandwidth estimation functionality as described above. The example of FIG. 6 provides several modules that may be included in instruction media 620; however, different and/or additional modules may also be included.

Example modules that may be involved in providing bandwidth estimation functionality described herein include, for example, probe reception module 630, packet delay module 635, packet loss module 640, congestion metric module 645, bandwidth estimation module 650 and/or parameter management module 655. As used herein, a module refers to routine, a subsystem, logic circuit, microcode, etc., whether implemented in hardware, software, firmware or some combination thereof.

In various embodiments, probe reception module 630 functions to receive one or more packets of a probe train. Probe reception module 630 can receive the packets through, for example, interface(s) 616. Probe reception module 630 can include one or more queues (not illustrated in FIG. 6) and/or can use memory 614. In some embodiments, probe reception module 630 can function to receive packets that are not probe packets also.

In various embodiments, packet delay module 635 functions to determine packet delay for one or more packets in the probe train. Packet delay module 635 can be coupled with probe reception module ad/or memory 614 to process the packets. Various techniques can be used to determine packet delay.

In various embodiments, packet loss module 640 functions to determine packet loss information for one or more packets in the probe train. Packet loss module 640 can be coupled with probe reception module ad/or memory 614 to process the packets. Various techniques can be used to determine packet loss.

In various embodiments, congestion metric module 645 functions to determine a congestion metric based on one or more of the techniques described above. Congestion metric module 645 can be coupled with packet delay module 635, packet loss module 640 and/or memory 614 to generate the congestion metric.

In various embodiments, bandwidth estimation module 650 functions to determine an estimated available bandwidth based, at least in part, on the congestion metric from congestion metric module 645.

In various embodiments, parameter management module 655 functions to manage one or more parameters associated with network packet communications. One or more network transmission characteristics (e.g., path selection, queue depth, queue type) can be modified based on the estimated available bandwidth.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

In the preceding description, numerous specific details are set forth. However, embodiments of the invention may be practiced without these specific details. In other instances, well-known structures and techniques have not been shown in detail in order not to obscure the understanding of this description.

What is claimed is:

1. A non-transitory computer-readable medium having stored thereon sequences of instructions that, when executed by one or more processors, are configurable to cause the one or more processors to:
   receive a train of probe packets, via a network interface, from a remote electronic device;
   select at least two packets from the train of probe packets;
   measure, for each selected packet from the train of probe packets, a network transmission delay;
   measure, for each selected packet from the train of probe packets, a number of packets not received in a subset of the train of probe packets;
   compute an estimate of per-packet network congestion for each of the selected packets from the train of probe packets based on the number of packets not received for the corresponding selected packet and the network transmission delay for the corresponding selected packet; and
   compute an estimated available bandwidth based on the network transmission delay and the estimate of per-packet network congestion for the selected packets.

2. The non-transitory computer-readable medium of claim 1, wherein an Excursion Detection Algorithm (EDA) is utilized to select one or more packets from the train of probe packets based on the estimated network congestion of the selected packets.

3. The non-transitory computer-readable medium of claim 1, wherein a Bump Detection Algorithm (BDA) is utilized to select the at least two packets from the train of probe packets based on the estimated network congestion of the selected packets.

4. The non-transitory computer-readable medium of claim 1, wherein the network transmission delay comprises a one-way delay (OWD).

5. The non-transitory computer-readable medium of claim 4, wherein the network congestion estimation of a selected packet comprises the OWD of the corresponding selected packet plus an additional factor based on packet losses.

6. The non-transitory computer-readable medium of claim 1, wherein the network congestion estimation of a selected packet is determined based on the OWD for the packet, Inter Departure Times (IDT) for the packet, Inter Arrival Times (IAT) for the packet, and the number of packets not received between two packets of the train of probe packets.

7. The non-transitory computer-readable medium of claim 1 wherein the network congestion estimation is determined based on OWD reconstruction where the OWD of received and lost packets are modified to match an infinite queue.

8. The non-transitory computer-readable medium of claim 1 wherein the network congestion estimation is determined based on a complex function utilizing one or more of: one-way delay (OWD), inter departure time (IDT), inter arrival time (IAT) and packet loss between received packets.

9. A method comprising:
   receiving a train of probe packets, via a network interface, from a remote electronic device;
   selecting at least two packets from the train of probe packets with one or more hardware processing devices;
   measuring, with the one or more hardware processing devices, a network transmission delay for each selected packet from the train of probe packets;
   measuring, with the one or more hardware processing devices, a number of packets not received in a subset of the train of probe packets;
   computing, with the one or more hardware processing devices, an estimate of network congestion for each of the selected packets from the train of probe packets based on the number of packets not received for the corresponding selected packet and the network transmission delay for the corresponding selected packet; and
   computing, with the one or more hardware processing devices, an estimated available bandwidth based on the estimate of network congestion for the selected packets and the transmission delay for the selected packets.

10. The method of claim 9, wherein an Excursion Detection Algorithm (EDA) is utilized to select one or more packets from the train of probe packets based on the estimated network congestion of the selected packets.

11. The method of claim 9, wherein a Bump Detection Algorithm (BDA) is utilized to select the at least two packets from the train of probe packets based on the estimated network congestion of the selected packets.

12. The method of claim 9, wherein the network transmission delay comprises a one-way delay (OWD).

13. The method of claim 12, wherein the network congestion estimation of a selected packet comprises the OWD of the corresponding selected packet plus an additional factor based on packet losses.

14. The method of claim 9, wherein the network congestion estimation of a selected packet is determined based on the OWD for the packet, Inter Departure Times (IDT) for the packet, Inter Arrival Times (IAT) for the packet, and the number of packets not received between two packets of the train of probe packets.

15. The method of claim 9 wherein the network congestion estimation is determined based on OWD reconstruction where the OWD of received and lost packets are modified to match an infinite queue.

16. The method of claim 9 wherein the network congestion estimation is determined based on a complex function utilizing one or more of: one-way delay (OWD), inter departure time (IDT), inter arrival time (IAT) and packet loss between each received packet.

17. A system comprising:
a memory system;
one or more processors coupled with the memory system, the one or more processors configurable to receive a train of probe packets, via a network interface, from a remote electronic device,
to select at least two packets from the train of probe packets, to measure, for each selected packet from the train of probe packets, a network transmission delay, to measure, for each selected packet from the train of probe packets, a number of packets not received in a subset of the train of probe packets, to compute an estimate of network congestion for each of the selected packets from the train of probe packets based on the number of packets not received for the corresponding selected packet and the network transmission delay for the corresponding selected packet, and to compute an estimated available bandwidth based on the estimate of network congestion for the selected packets and the transmission delay for the selected packets.

18. The system of claim 17 wherein the network congestion estimation is determined based on a complex function utilizing one or more of: one-way delay (OWD), inter departure time (IDT), inter arrival time (IAT) and packet loss between each received packet.

19. The system of claim 17, wherein an Excursion Detection Algorithm (EDA) is utilized to select one or more packets from the train of probe packets based on the estimated network congestion of the selected packets.

20. The system of claim 17, wherein a Bump Detection Algorithm (BDA) is utilized to select the at least two packets from the train of probe packets based on the estimated network congestion of the selected packets.

* * * * *